(12) United States Patent
Phillips et al.

(10) Patent No.: US 12,515,725 B2
(45) Date of Patent: Jan. 6, 2026

(54) TRANSPORTATION RACK WITH SUSPENDED SUPPORT MEMBERS

(71) Applicant: Diverse Global Industrial Solutions, Saugatuck, MI (US)

(72) Inventors: Jonathan L Phillips, Fennville, MI (US); Robert T Schaftenaar, II, Holland, MI (US); Ryan A Bieneman, Geneseo, IL (US)

(73) Assignee: Diverse Global Industrial Solutions, Saugatuck, MI (US)

( * ) Notice: Subject to any disclaimer, the term of this patent is extended or adjusted under 35 U.S.C. 154(b) by 355 days.

(21) Appl. No.: 18/106,023

(22) Filed: Feb. 6, 2023

(65) Prior Publication Data

US 2024/0262404 A1 Aug. 8, 2024

(51) Int. Cl.
| A47B 43/00 | (2006.01) |
| A47B 45/00 | (2006.01) |
| A47B 51/00 | (2006.01) |
| A47F 5/10 | (2006.01) |
| B62B 3/00 | (2006.01) |
| B62B 3/02 | (2006.01) |

(52) U.S. Cl.
CPC ............ B62B 3/005 (2013.01); A47B 43/003 (2013.01); A47B 45/00 (2013.01); A47B 51/00 (2013.01); A47F 5/108 (2013.01); B62B 3/02 (2013.01)

(58) Field of Classification Search
CPC ....... B62B 3/005; B62B 3/02; B62B 2203/10; B62B 2206/06; A47B 45/00; A47B 46/00; A47B 31/00; A47B 2031/002; A47B 2031/003; A47B 2031/004; A47B 2031/005; A47B 2031/007; A47B 2031/008; A47B 43/003; A47B 43/006; A47B 81/04; A47B 51/00; A47B 61/02; B65G 1/026; A47F 5/108
USPC ............ 211/134, 1.51, 1.56, 209; 280/47.35
See application file for complete search history.

(56) References Cited

U.S. PATENT DOCUMENTS

| 2,717,085 | A | * | 9/1955 | Waddington | ............. | B65G 1/07 |
| | | | | | | 211/74 |
| 3,157,155 | A | * | 11/1964 | Duntley | ............... | A01K 31/002 |
| | | | | | | 119/455 |
| 4,345,802 | A | | 8/1982 | Sorensen | | |

(Continued)

FOREIGN PATENT DOCUMENTS

| JP | 3011411 U | 5/1995 | |
| JP | 2007054094 A | 3/2007 | |
| WO | WO-2024167919 A1 * | 8/2024 | ............. B62B 3/005 |

*Primary Examiner* — Jennifer E. Novosad
(74) *Attorney, Agent, or Firm* — Price Heneveld, LLP

(57) ABSTRACT

A transportation rack includes a frame having a base configured for resting on a surface and first and second track members and positioned parallel to each other and extending upwardly away from the base between respective lower ends and upper ends, a first support member extending between the track members and respectively slidably connected with each of the first and second track members at opposite lateral ends of the first support member, and a second support member extending between the first and second track members and respectively slidably connected with each of the first and second track members at opposite lateral ends of the second support member, the second support member being coupled with the first support member by a flexible connection.

20 Claims, 10 Drawing Sheets

(56) References Cited

U.S. PATENT DOCUMENTS

| | | | | |
|---|---|---|---|---|
| 4,967,733 | A * | 11/1990 | Rousseau | B66F 11/04 |
| | | | | 182/69.6 |
| 5,725,118 | A | 3/1998 | Slager et al. | |
| 6,035,973 | A * | 3/2000 | Neal | B65G 1/07 |
| | | | | 187/244 |
| 7,258,232 | B2 | 8/2007 | Bradford et al. | |
| 7,287,872 | B2 * | 10/2007 | Kubota | A47B 43/006 |
| | | | | 362/418 |
| 7,481,440 | B2 * | 1/2009 | Weber | B62B 3/003 |
| | | | | 414/495 |
| 7,556,170 | B2 | 7/2009 | Vroon | |
| 7,575,098 | B2 * | 8/2009 | Hartley | B66B 9/00 |
| | | | | 248/330.1 |
| 8,075,237 | B2 * | 12/2011 | Webster | E04H 6/18 |
| | | | | 414/331.14 |
| 8,424,983 | B1 * | 4/2013 | Strauss | A47B 51/00 |
| | | | | 312/247 |
| 8,616,388 | B2 * | 12/2013 | Butler | A47B 43/00 |
| | | | | 108/106 |
| 8,939,296 | B2 * | 1/2015 | Weyler | A47B 51/00 |
| | | | | 211/1.51 |
| 9,266,674 | B2 * | 2/2016 | Reimer | B65G 1/026 |
| 9,420,881 | B2 * | 8/2016 | Reid | A47B 51/00 |
| 9,452,865 | B2 * | 9/2016 | Joshi | B65D 19/06 |
| 9,546,021 | B2 * | 1/2017 | Stover | B65D 19/44 |
| 9,738,447 | B1 * | 8/2017 | Schaftenaar | A47B 45/00 |
| 9,999,299 | B2 * | 6/2018 | Neuwirth | A47F 5/08 |
| 10,766,516 | B2 * | 9/2020 | Finstad | B62B 3/002 |
| 10,932,564 | B2 * | 3/2021 | Jarr | A47F 5/0018 |
| 11,110,947 | B2 * | 9/2021 | Finstad | B62B 3/004 |
| 2008/0047917 | A1 | 2/2008 | Hernandez et al. | |
| 2010/0117499 | A1 * | 5/2010 | Fortier | A45C 7/0031 |
| | | | | 312/306 |
| 2012/0248046 | A1 * | 10/2012 | Warner | A47B 51/00 |
| | | | | 211/1.57 |
| 2015/0014264 | A1 * | 1/2015 | Linnell, Sr. | B62B 3/005 |
| | | | | 108/147.11 |
| 2015/0323244 | A1 * | 11/2015 | Marts | A47B 96/025 |
| | | | | 108/65 |
| 2017/0055699 | A1 | 3/2017 | Neuwirth et al. | |
| 2023/0062304 | A1 * | 3/2023 | Bidram | B25J 18/04 |
| 2023/0249908 | A1 * | 8/2023 | Steinberg | B65G 1/026 |
| | | | | 211/209 |
| 2024/0262404 | A1 * | 8/2024 | Phillips | B62B 3/005 |

* cited by examiner

TRANSPORTATION RACK WITH SUSPENDED SUPPORT MEMBERS

BACKGROUND OF THE DISCLOSURE

The present disclosure generally relates to a transportable storage rack, and more specifically, to a storage rack with moveable and collapsible support members.

SUMMARY OF THE DISCLOSURE

According to one aspect of the present disclosure, a transportation rack includes a frame having a base configured for resting on a surface and first and second track members and positioned parallel to each other and extending upwardly away from the base between respective lower ends and upper ends, a first support member extending between the track members and respectively slidably connected with each of the first and second track members at opposite lateral ends of the first support member, and a second support member extending between the first and second track members and respectively slidably connected with each of the first and second track members at opposite lateral ends of the second support member, the second support member being coupled with the first support member by a flexible connection. An actuator is coupled between the frame and the first support member and is operable to move the first support member between a raised position and a lowered position along the track members such that the second support member is suspended from the first support member by the flexible connection therebetween at least when the first support member is in the raised position.

According to another aspect of the present disclosure, a transportation rack includes a frame having a base configured for resting on a surface and first and second track members and positioned parallel to each other and extending upwardly away from the base between respective lower ends and upper ends, a driven support member extending between the track members and respectively slidably connected with each of the first and second track members at opposite lateral ends of the driven support member, and an actuator coupled between the frame and the driven support member and operable to move the driven support member between a raised position and a lowered position along the track members. A plurality of suspended support members including an uppermost suspended support member are coupled with the driven support member with remaining ones of the suspended support members successively coupled together by respective flexible connections such that the suspended support members are suspended from the driven support member by the flexible connection therebetween at least when the driven support member is in the raised position.

According to yet another aspect of the present disclosure, a transportation rack includes a frame having a base configured for resting on a surface and first and second track members and positioned parallel to each other and extending upwardly away from the base between respective lower ends and upper ends, a driven support member extending between the track members and respectively slidably connected with each of the first and second track members at opposite lateral ends of the driven support member and moveable between a raised position and a lowered position along the track members, and a plurality of suspended support members including an uppermost suspended support member coupled with the driven support member with remaining ones of the suspended support members successively coupled together by respective flexible connections such that the suspended support members are suspended from the driven support member by the flexible connection therebetween at a suspended distance at least when the driven support member is in the raised position and the suspended support members at least partially collapse against the base of the frame such that the driven support members and the suspended support members extend through a height that is less than the suspended distance when the driven support member is in the lowered position.

These and other features, advantages, and objects of the present disclosure will be further understood and appreciated by those skilled in the art by reference to the following specification, claims, and appended drawings.

Figure 1:
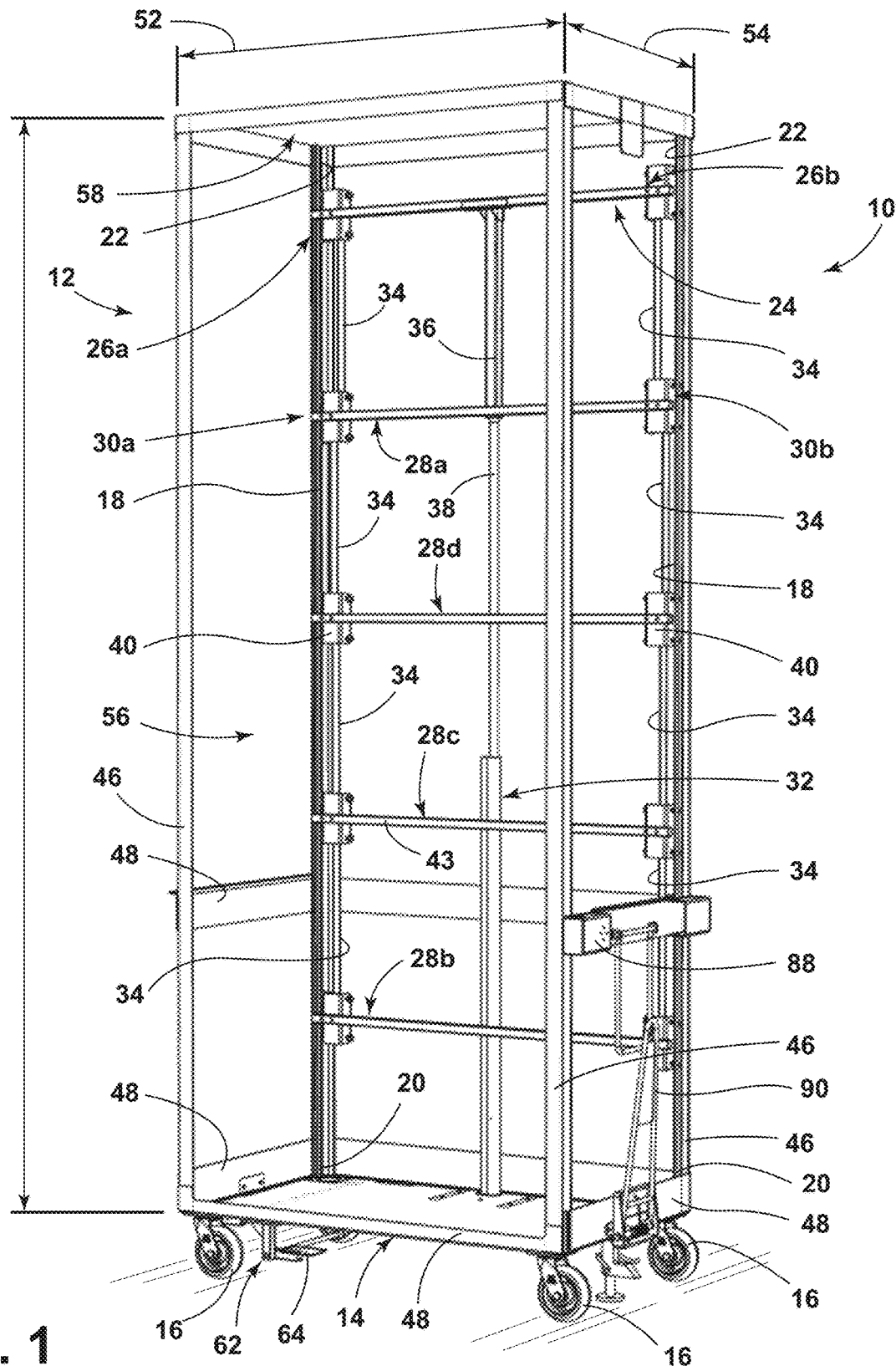
FIG. 1 is a front perspective view of a transportation rack according to an aspect of the disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a moveable and reconfigurable transportation rack. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Ordinal modifiers (i.e., "first", "second", etc.) may be used to distinguish between various structures of the disclosed transportation rack in various contexts, but that such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about", "approximately", or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

Referring to FIGS. 1-12, reference numeral 10 generally designates a transportation rack. The transportation rack 10 includes a frame 12 having a base 14 configured for resting on a surface S. In the example illustrated in FIG. 1, the base 14 includes four casters 16 (further shown in FIG. 2) through which the base 14 rests on the surface S, with other configurations (including wheels, feet, and combinations thereof) may be possible. The frame 12 further includes first and second track members 18 positioned parallel to each other and extending upwardly away from the base 14 between respective lower ends 20 and upper ends 22. A first support member 24 extends between the track members 18 and is respectively slidably connected with each of the first and second track members 18 at opposite lateral ends 26a and 26b of the first support member 24. A second support member 28 extends between the first and second track members and is respectively slidably connected with each of the first and second track members 18 at opposite lateral ends 30a and 30b of the second support member 28. The second support member 28 is flexibly connected with the first support member 24, as discussed in greater detail herein. An actuator 32 is coupled between the base 14 of the frame 12 and the first support member 24 and is operable to move the first support member 24 between a raised position (as shown, for example, in FIG. 1) and a lowered position (FIG. 6C) along the track members 18 such that the second support member 28 is suspended from the first support member 24 by the flexible connection therebetween at least when the first support member 24 is in the raised position.

The positioning and mutual coupling of the actuator 32 between the base 14 of the frame 12 and the above-mentioned first support member 24 is such that the first support member is driven in movement (at least in the upward direction U) by extension of the actuator 32. In this manner, the first support member 24 may additionally or alternatively be referred to herein as the "driven" support member 24. Additionally, it is contemplated that the actuator 32 may take other forms in addition to that which is shown in the present example and may be coupled between the frame 12 and the driven support member 24 in different configurations corresponding with the type of actuator 32 to achieve generally the same movement of the driven support member 24 as described in connection with the present example. For instance, the actuator 32 can be in the form of a motor and chain arrangement, wherein the motor is mounted with the frame 12, for example, along the upper-rear horizontal support 48, such that the motor can draw in the chain to lift the driven support member 24 from above. In a variation, the motor may be coupled elsewhere on the frame 12, including with the base 14 or the intermediately-positioned rear horizontal member 48 such that the chain can pass over a sprocket or pulley rotatably coupled with or adjacent the upper-rear horizontal support 48. In a further example, the chain may be replaced by a cable in similar arrangements and/or the motor can be replaced by a winch with a hand-crank such that the actuator 32 is in the form of a manual actuator.

Figure 3:
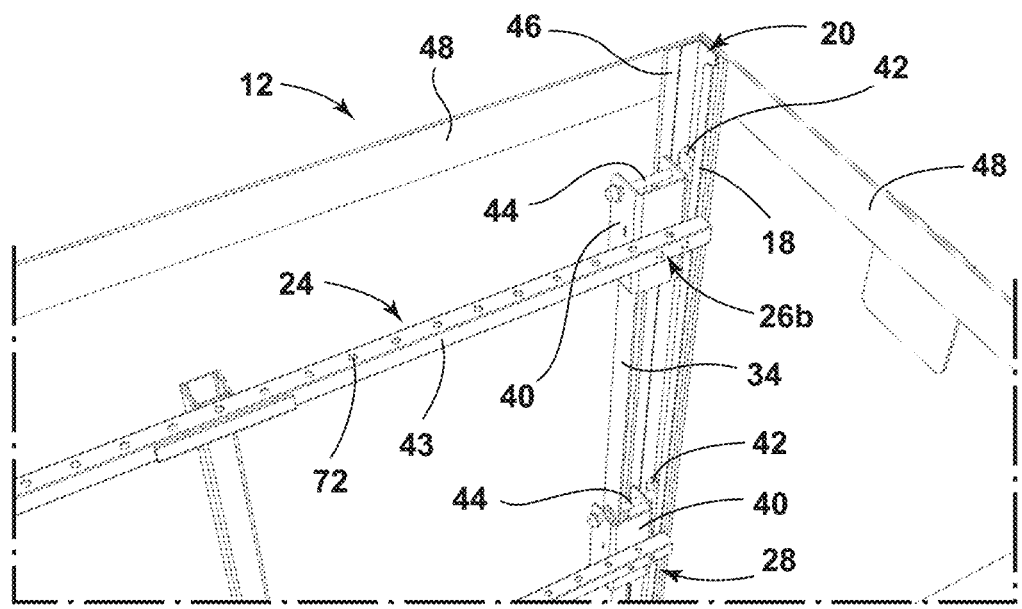
FIG. 3 is a top-perspective detail view of a support member of the transportation rack.
Figure 4:
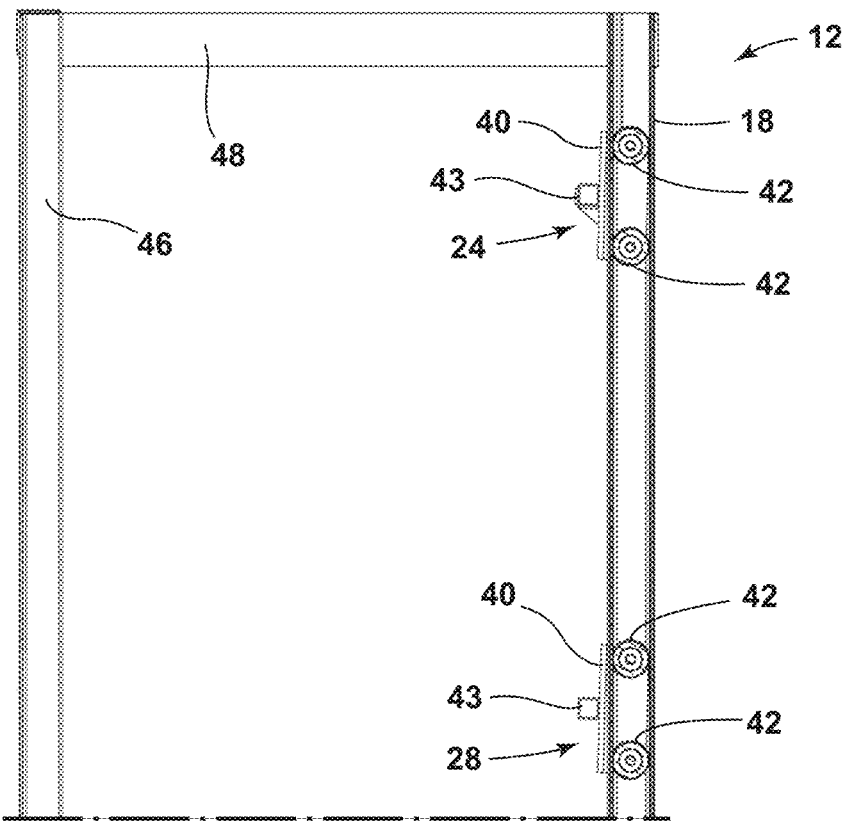
FIG. 4 is a side cross-section view of a moveable coupling between support members and a track member of the rack.
Figure 5:
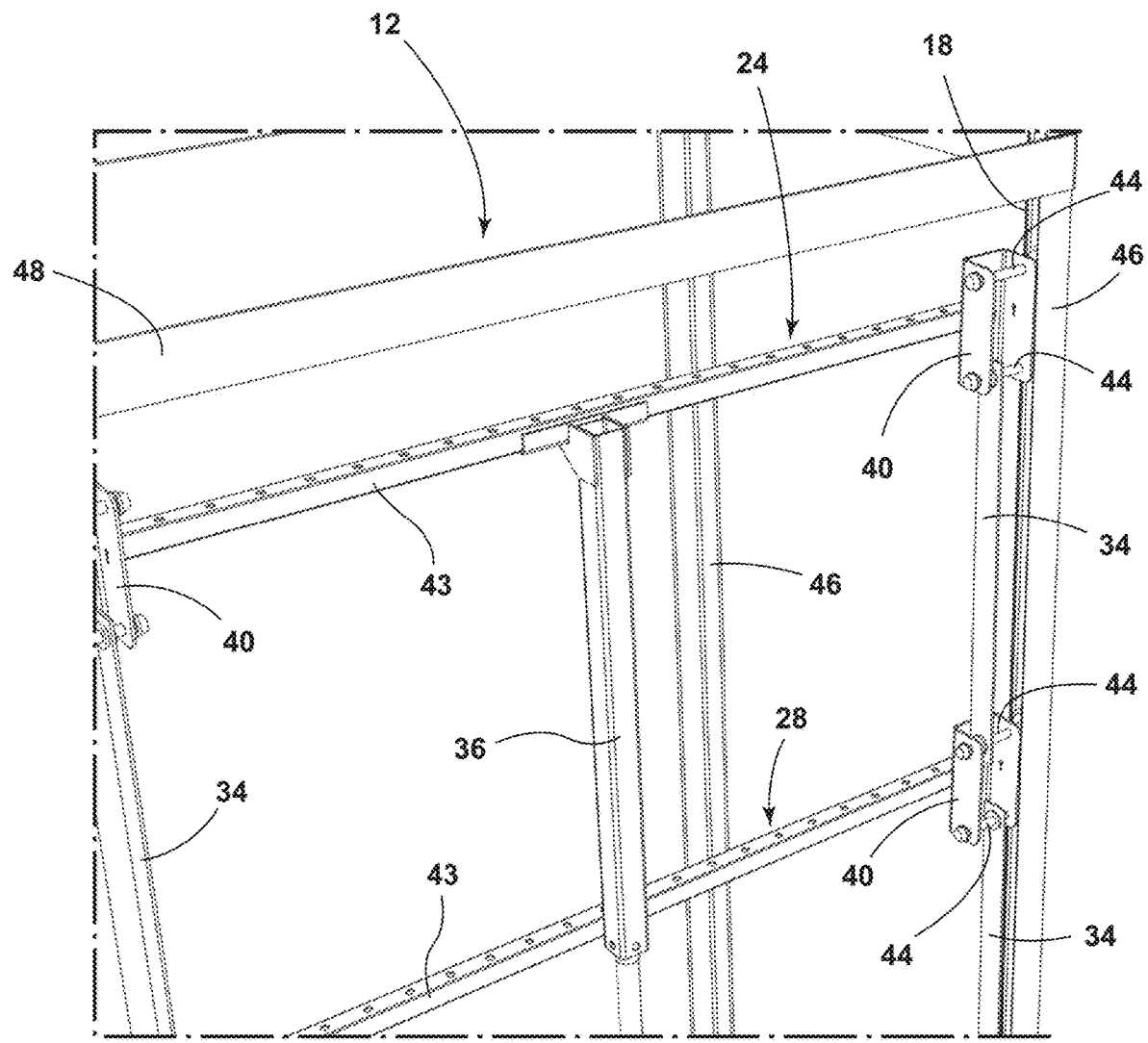
FIG. 5 is back-perspective detail view of a flexible coupling between support members of the transportation rack.

The above-referenced second support member 28 is suspended from the first support member 24, by way of the above-mentioned flexible connection, such that the second support member 28 may additionally or alternatively be referred to as a "suspended" support member 28. More particularly, in the example of the rack 10 depicted in the Figures, the rack 10 includes a plurality of suspended support members 28 including an uppermost suspended support member 28a that is flexibly connected with the driven support member 24, as shown in FIGS. 3 and 4, with remaining ones of the suspended support members 28 successively flexibly connected together. The suspended support members 28 are described herein as being successively flexibly connected together in that each of the suspended support members 28 is connected with the other one of the support members (i.e., the driven support member 24 or another suspended support member 28, as applicable) that is immediately above that suspended support member 28. In this manner, all of the suspended support members 28 are flexibly connected together and with the driven support member 24 by way of their mutual connection and by the connection of the uppermost suspended support member 28a with the driven support member 24. This configuration results in the arrangement shown in FIG. 1, wherein all of the suspended support members 28 are suspended (directly or indirectly) from the driven support member 24, at least when the driven support member 24 is in the depicted raised position.

As can be appreciated, to achieve the depicted suspension of the suspended support members 28 (both mutually and from the driven support member 24) the flexible connection therebetween is configured to extend to a maximum height $H_1$ that is maintained between the connected support members (i.e., the driven support member 24 and/or suspended support members 28, as applicable) when the driven support member 24 is at least in the raised position, as discussed further below. In this manner, the flexible connection can be achieved by way of a series of flexible connection members 34. To achieve the successive connection between the suspended support members 28, the flexible connection members 34 are connected between each of the suspended support members 28 in the above-described successive manner, with the uppermost suspended support member 28a also being flexibly connected with the driven support member 24 by at least one flexible connection member 34. In the depicted example, each flexible connection between the suspended support members 28 and of the uppermost suspended support member 28 with the driven support member 24 by two flexible connection members positioned at and connecting between the lateral ends 26a, 26b of the driven support member 24 and the lateral ends 30a, 30b of the suspended support members 28. In the illustrated example, the flexible connection members 34 can be nylon straps (e.g., of woven nylon filaments), an elastomer impregnated woven nylon textile, or the like) that support the suspended support members 28 at the above-mentioned maximum height H1 therebetween under tension such that the nylon straps comprising the flexible connection members 34 are held generally straight and taut. The flexible nature of these flexible connection members 34 is, accordingly, such that the height between the support members 24 and/or 28 can be reduced below the maximum height $H_1$ by flexing (e.g., bending) of the flexible connection members 34. In this manner, the flexible connection members 34 can consist of other structures or elements that can be configured to extend to the maximum height H1 to support the suspended support members 28, while allowing the height therebetween to decrease, including under the conditions discussed further below. In various aspects, the flexible connection members can be wire cables, flexible metal rods, or other telescoping structures or elements.

As shown in FIGS. 5A-5C, the flexible connection of and between the suspended support member 28 allows for the arrangement of suspended support members 28 to "collapse" against, for example, the base 14 of the frame 12 when the driven support member 24 is lowered from the raised position. More particularly, referring back to FIG. 1, the arrangement of, and flexible connection between, the suspended support members 28 and of the uppermost suspended support member 28a to the driven support member 24 is such that a lowermost suspended support member 28b is positioned beneath the driven support member 24 at a suspended distance SD when the driven support member 24 is in the raised position. In this position, the lowermost support member 28b is spaced from the base 14 by a distance that is less than the difference in the height of the driven support member in the raised and lowered positions. In this manner, as the driven support member 24 is lowered under control of the actuator 32, the lowermost suspended support member 28b will be brought into contact with the base 14 of the frame 12, as shown in FIG. 5A. In an alternative arrangement, a flange, stop, or other feature may be attached with one or more of the base 14 or the track members 18 such that the lowermost support member 28b rests on that feature and, accordingly, above the base by a predetermined distance (e.g., about 6 inches or less). In either example, the flexible connection, particularly, between the lowermost suspended support member 28b and the other suspended support member 28 immediately above it allows the distance between the driven support member to decrease from the suspended distance SD, thereby accommodating continued lowering of the driven support member, as shown in FIG. 5B. In one aspect, such lowering can continue, including to a point also shown in FIG. 5B where the suspended support member 28c above the lowermost suspended support member 28b contacts the lowermost suspended support member 28b.

Turning to FIG. 5C, after lowering of the driven support member 24 brings the suspended support member 28c into contact with the lowermost support member, the actuator 32 can continue to lower the driven support member 24 with the flexible connection provided by the flexible connection members 34 between suspended support member 28c and the other suspended support member 28d immediately above it further allows the distance between the driven support member to decrease, thereby accommodating further continued lowering of the driven support member, as shown in FIG. 5C. In this manner, the downward movement of the driven support member 24 can continue until the lower end of the range of motion of the actuator 32 is reached to define the lowered position of the driven support member 24. In the present example, the lowered position of the driven support member 24 is reached when the suspended support member 24d is lowered toward suspended support member 24c to a distance less than the maximum extension height $H_1$ defined therebetween by the flexible connection members 34 but before the suspended support member 24d contacts suspended support member 24c. In particular, the illustrated example can be configured with four suspended support members 28 beneath the driven support member 24, with the support members 24 and 28 being evenly spaced from each other at a distance $H_1$ of about (e.g., +/−5%) 24 inches by flexible connection members 34 of a corresponding, equal length.

The actuator 32, as described further below, is configured with a range of motion of about 39 inches. In this manner, the actuator 32 couples with driven support member 24 by way of an extension arm 36 that couples on one end thereof with the free end of the actuator piston 38 and on the other end thereof with the central portion of the driven support member 24. The extension arm 36 allows the raised position of the driven support member 24 to be higher than the length of the actuator 32, as desired. In one aspect, the extension arm 36 can have a length of about 25 inches such that, in the raised position the upper end of the driven support member 24 is positioned at about 116 inches above the base 14 of the frame 12. With the range of motion of the actuator 32, discussed above, the driven support member 24 can be moved into the lowered position, which corresponds with a distance of about 131 inches from the base 14 of the frame 12. In the depicted arrangement of suspended support members 28, aside from the positioning of the three lowest suspended support member 28b, 28c, and 28d, discussed above, the other of the suspended support members 28e remains positioned below the uppermost suspended support member 28a at a maximum extension height H1, with the uppermost suspended support member 28a similarly remaining at the maximum extension height H1 below the driven support member 24. In this manner, in an alternative arrangement, the driven support member 24 and suspended support members 28a and 28d can be rigidly fixed together. In further alternative arrangements, variations of the actuator 32 can be provided that has a greater range of motion, such that the lowered position of the driven support member 24 can position it closer to base 14, with corresponding movement and collapsing of the suspended support members 28 accommodating such movement by way of the flexible connection member 34. In even further variations, the rack 10 can include additional suspended support members 28 with shorter maximum extension heights H1 or with a taller raised position of the driven support member 24. In such variations, movement of the driven support member 24 into its lowered position can be accommodated by variations of the collapsing arrangement described herein that would be understood based on the principles of the present disclosure.

As can be appreciated based on the above, the flexible connection of the lowermost suspended support member 28b (e.g., by way of the successive flexible connections among the support members 24 and 28) is such that the lowermost suspended support member 24a is suspended from the first support member at the suspension distance SD when the driven support member 24 is in the raised position and is, further, positioned within the suspension distance (i.e., at a distance closer to) with respect to the driven support member 24 when the driven support member 24 is in the lowered position. Similarly, it can be realized that the lowermost suspended support member 28b is suspended from the driven support member 24 when the driven support member 24 is positioned from the base 14 at a distance greater than the supporting distance SD. Similarly, suspended support member 28c is ultimately flexibly connected with the driven support member 24 such that suspended support member 28c is positioned at its own supporting distance $SD_1$ beneath the driven support member 24 when the driven support member 24 is in the raised position.

Figure 6C:
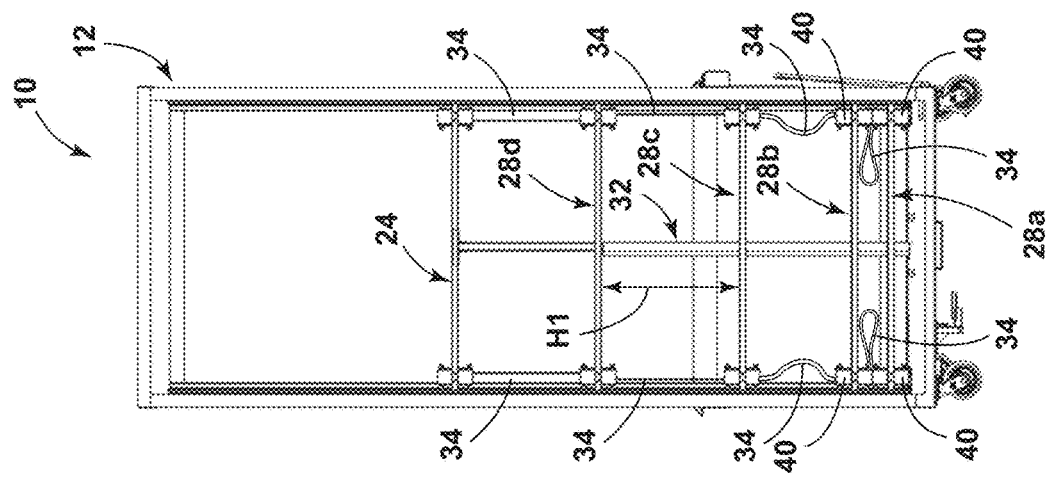
FIGS. 6A-6C are front perspective views of the transportation rack in successive steps of lowering the support members thereof.
Figure 6B:
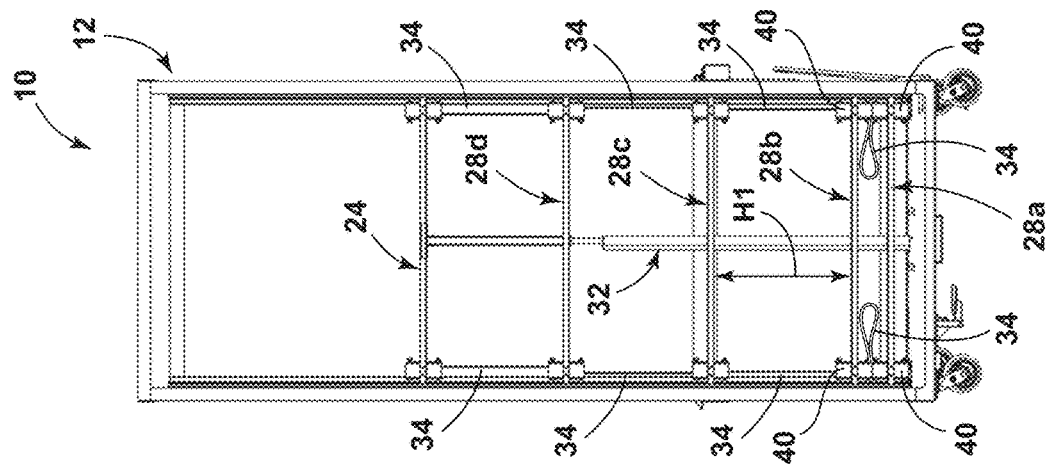
Figure 6A:
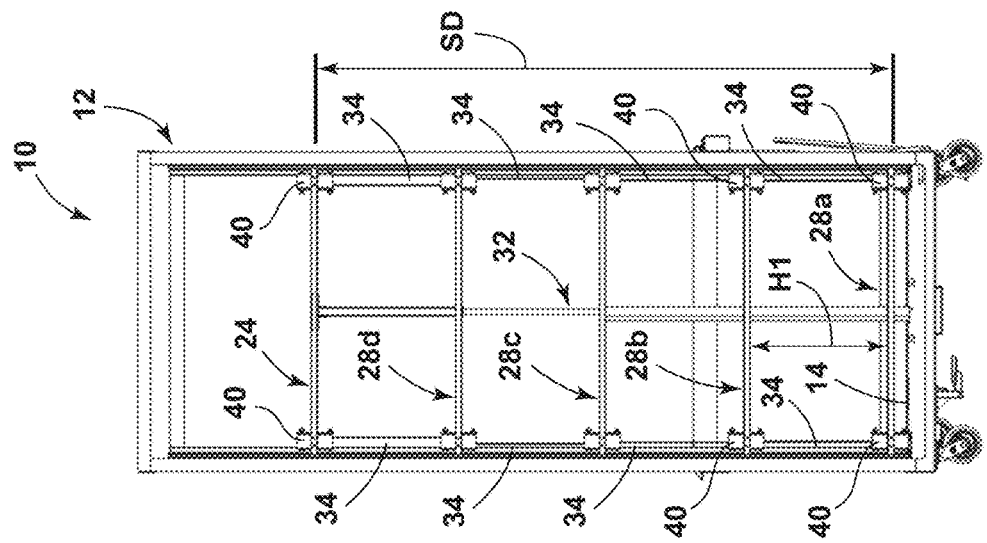
Figure 7:
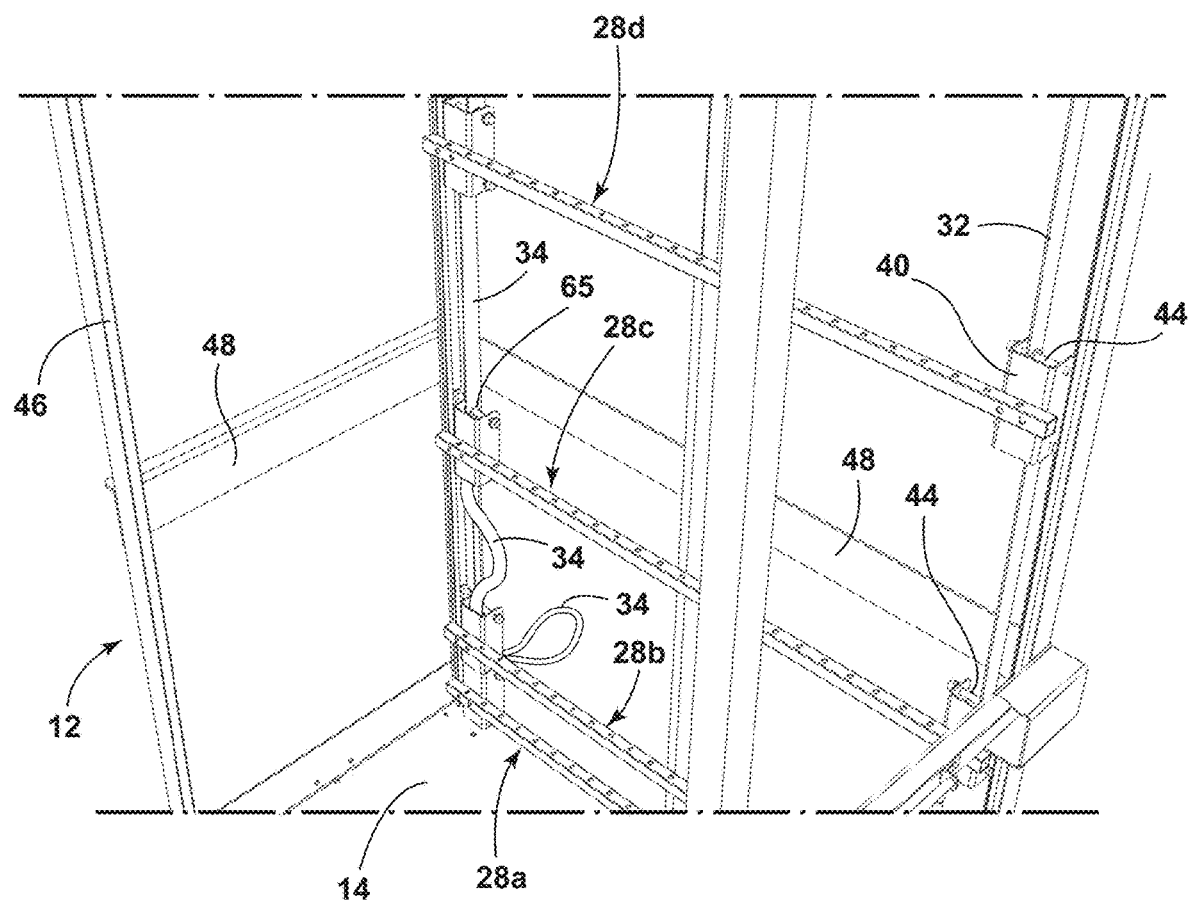
FIG. 7 is a front perspective detail view of lower support members in a collapsed arrangement against the base of the transportation rack when in a lowered position.

Returning to FIGS. 3 and 4, and with additional reference to FIGS. 6 and 7, the support members 24 and 28 each include a carriage unit 40 that slidably connects the respective support member 24, 28 with each of the track members 18 to define the opposite lateral ends 26a, 26b of the support members 24 and 28. Additionally, each support member 24, 28 includes a horizontal member 43 extending between the first and second carriage units 40. Each of the carriage units 40 includes at least one wheel 42 mounted therewith and engaged with the associated track member 18. As particularly shown in FIG. 3, the track members can be generally C-shaped in cross section such that the wheels 42 are captured therein. Further, in the present example, each carriage unit 40 can include two wheels engaged with and captured by the associated track member 18 to provide torsional stability of the support member 24 or 26 under a load, as discussed further below. The wheels 42 can be respectively mounted on axles 44 that couple with the carriage units 40, which may be U-shaped members such that the axles 44 are horizontally supported at multiple points for sufficient stability. In one aspect, the flexible connection members 34 can be coupled with the axles 44. More specifically, the support members 24, 28 can connect with the next lower (where applicable) support member 28 by way of the lower one of the two axles 44 and with the next higher support member 24 or 28 by way of the upper one of the two axles 44, as shown in FIGS. 3 and 4. In a variation of the illustrated example, the support members 24, 28 can be U-shaped or rectangular in the horizontal plane such that the support members 24, 28 have side members that extend forward to the front vertical supports 46 of the frame 12. In connection with this arrangement, the front vertical supports 46 can include additional, respective track members 18 mounted therewith that can receive one or more wheels 42 on additional carriage units 40 mounted on the front sides of the reconfigured support members 24, 28. This arrangement can provide additional support or stability for variations of the rack 10 intended to carry higher loads, for example on the support members 24, 28. The additional portions of the support member 24, 28 according to this variation can provide alternative or additional attachment areas for the actuator 32, including the motor-based and manual variations discussed above.

Returning to FIGS. 1-4, the frame 12 is defined by a plurality of mutually rigidly-coupled frame members 46 and 48 that extend both vertically (vertical frame members 46) and horizontally (horizontal frame members 48) to define an open-sided prism. As shown, the frame 12 defines a height 50, width 52, and depth 54. In general, the dimensions (height 50, width 52, and depth 54) of the frame 12 are configured to maximize an accessible storage area within frame 12, as further described below, while providing for a desired level of mobility of rack 10, as also described further below. In particular, the frame 12 can be sized to reduce the risk of tipping of frame 12, such as during movement thereof, for example, while providing frame 12 with a width 52 that facilitates movement around a factory floor and a depth 54 that allows for a reasonable turning radius of rack 10, including when multiple racks 10 are coupled together in the articulating manner discussed below.

The particular values of the dimensions 50, 52, 54 can also vary according to the materials used for construction thereof, including the weight of such materials, as well as the anticipated loading of rack 10. In one example, the height 50 of frame 12 can be between about 8 feet and 12 feet and, in one example about 10 feet. In such an example, the width 52 can be at least about 2 feet and, in one example about 4 feet, and the depth 54 can vary from between about 2 feet to 3 feet (and in one example can be about 2.5 feet), although the particular dimensions can vary. In one aspect, frame 12 can be constructed with vertical frame members 46 that are L-shaped in cross-section. As can be seen in FIGS. 3 and 4, in particular, the vertical frame members 46 can be constructed with a material thickness of, for example, between 3/32" and 1/4" (although other thicknesses are contemplated, depending on the use and application of rack 10). In addition, the L-shaped cross-section can be formed from multiple flat elements that are integrally-formed together (such as in a single L-shaped extrusion) or rigidly affixed together (such as by welding or the like) at a 90° angle. Further, horizontal frame members 48 can be single planar members of a desired thickness to provide the above-described supportive characteristics thereof.

As further shown in the figures, and in FIGS. 3 and 4, in particular, the support members 46, 48 are arranged such that the frame 12 is in the shape of the above-described prism, while being generally open-sided. In particular, such an arrangement includes an open upper side 56 and an open front side 56 of the frame 12. As such, the support members 46, 48 can be of a rigid material and can be rigidly joined together to give frame 12 a desired level of support for track members 18, which may be rigidly coupled with the vertical frame members 46 opposite the open front side 56 (including using mechanical fasteners or the like), the support members 24 and 28, as well as items carried thereby, as discussed further below. In particular, frame members 46 and 48 can be of a metallic material, including steel or the like, that can be of an appropriate thickness to prevent bending or buckling of frame 12. Further, frame members 46 and 48 can be welded together (or otherwise coupled together using alternative means including industrial adhesives, or mechanical fasteners such as screws, bolts (with mating threads integrated with relevant portions of rack 10 or corresponding nuts), rivets, or the like) at the various intersections thereof to give the desired prism shape. It is further noted that while horizontal frame members 48 can primarily be used to define the open upper side 56 of frame 12, as well as the base 14 of frame 12 (or at least a supportive perimeter thereof), additional horizontal frame members 48 can be positioned between the open upper side 56 and base 14 of frame 12 to provide additional structural support for frame 12, including resistance to buckling of vertical frame members 46). Additionally, a plurality of horizontal frame members 48 may surround a portion of base 14.

As discussed above, frame 12 is configured to rest on a surface, which may include the ground, or more specifically, a factory floor or the like. As further discussed, the above-described dimensioning of frame 12 can be derived to achieve stability of rack 10 on such a surface when the driven support member 24 is in both the raised position, as well as the lowered position. In some embodiments, however, it may be desirable to add additional supportive elements beneath frame 12 to provide a measure of stability on an uneven surface or, as desired, mobility for rack 10. As shown in the figures, in the depicted embodiment, such stability and mobility is achieved by coupling casters 16 to and extending beneath the base 14 of frame 12. Such casters 16 may be rotating assemblies in all instances or on one side with the other side being fixed in direction. In various embodiments, casters 16 may be coupled to the lower ends of vertical frame members 46, along intermediate portions of desired ones of horizontal frame members 18 or on a lower side of surface 60 (which may be defined by a rigid planar member, such as ⅛" or ¼" steel sheet.

In such an embodiment, a brake mechanism 62 can further be coupled with bottom surface 60 of base 14 to selectively prevent movement of rack 10 by way of casters 16. Such a brake mechanism 62 can include a pedal 64 that is generally accessible by a user using his or her foot such that pedal 64 can be depressed to engage or release brake mechanism 62. In various embodiments, brake mechanism 62 can include features to frictionally engage with the surface between the wheels of the casters 16 to prevent rotation thereof, although other variations may be used.

Figure 8:
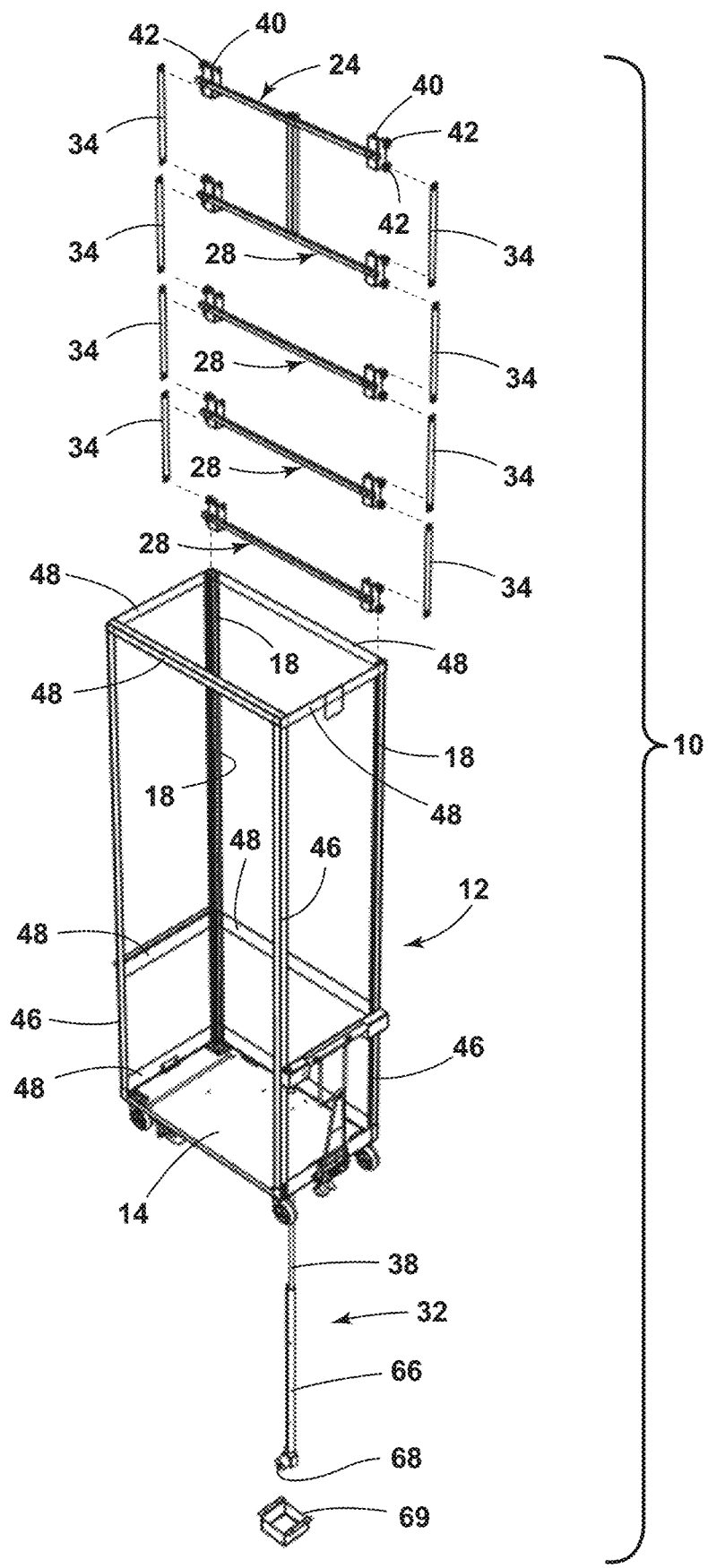
FIG. 8 is an assembly view of the transportation rack.

Referring to FIG. 8, the general assembly of the above-described components with frame 12 is shown. In particular, it can be seen that the support members 24 and 28 are successively slidably coupled with the track members 18. More particularly, the wheels 42 of the carriage units 40 that define the first and second lateral ends 30*a* and 30*b* of the suspended support members 28, as well as the first and second lateral ends 26*a* and 26*b* of the driven support member 24, are successively inserted into the C-shaped cross-section of the track members 18 such that the wheels are at least partially captured therebetween. In one implementation, the wheels 42 can be inserted through the open tope ends of the track members 18 in the manner shown in the assembly view of FIG. 8. In a variation, the C-shaped profile can be partially open along one side such that the carriage units 40 can be separately assembled with the respective track members 18 by inserting one side of the wheels 42 into the closed end at an angle and turning the carriage unit 40 laterally such that the opposite side of the wheel 42 moves through the open side of the track member 18. Once both carriage units 40 of the respective support member 24 or 28 are received in the track members 18, the horizontal extensions 43 are assembled between the carriage units 40 to fix the lateral and rotational positioning of the carriage units 40 (on a horizontal plane) such that the wheels 42 remain captured in the track members 18. In one aspect, the wheels 42 may have a relatively loose fit within the track members 18 that is sufficient to retain the wheels 42 within the track member, but loose enough to allow easy assembly and unobstructed movement of the carriage units 40 along the track members 18 (including by contact of the wheels 42 with opposite sides of the track members 18 under a torsional weight applied to the horizontal extensions 43).

Continuing with respect to FIG. 8, the flexible connection members 34 are assembled between the support members 24 and 28 to achieve the successive flexible coupling described above. In the present example, and as discussed above, the flexible connection members 34 are nylon straps that include metal grommets 65 that define attachment holes therein. The grommets 65 receive the respective upper and lower axles 44 of the carriage units 40 of successive support members 24 and 28. In this manner, the flexible connection members 34 are assembled with the carriage units 40 during assembly thereof and, notably, prior to assembly of the carriage units 40 with the track members 18. Accordingly, in one assembly process, all of the support members 24 and 28 can be assembled together and connected by the flexible connection members prior to being successively assembled with the track members 18 through the open top ends thereof. Alternatively, all of the carriage units 40 from each lateral end 26*a*, 30*a* and 26*b*, 30*b* can be connected together by successive attachment of the flexible connection members 34 before being assembled with the respective track members. Assembly of the support members 24, 28 can then be completed by assembly of the horizontal extensions 43 between the carriage units 40.

As also shown in FIG. 8, the actuator 32 of the present example is assembled between the base 14 of the frame 12 and the extension arm 36 of the driven support member 24. The actuator 32 may be a linear actuator having the above-mentioned piston 38 extendable from a housing 66. In the present example, the piston 38 may be driven by an internal power screw arrangement (both housing 66 and piston 38 being hollow to accommodate the screw portion with at least a portion of the interior of piston 38 being threaded such that rotation of the screw drives linear motion of the piston 38 in the upward vertical direction U or the downward vertical direction D, depending on the direction of rotation. In turn, the actuator 32 may include an electric motor 68 to drive rotation of the screw (either directly or by a reduction mechanism therebetween). Accordingly, the distance between the raised position and the lowered position of the driven support member 24 is defined by the extendable length of the piston 38. Accordingly, the actuator 32 can be selected to achieve the desired lowered position for the driven support member (according to the use-cases discussed further below), while allowing the rack 10 to include the desired number and spacing of suspended support members 28. In some implementations, a two-stage actuator may be used to provide an increased range between the raised and lowered positions of the driven support member 24. In other embodiments, actuator 32 may be a hydraulic or pneumatic actuator with appropriate assemblies for driving linear movement of such actuators being mounted beneath surface 60 of base 14. As discussed above, the actuator 32 can take other forms that are generally arranged to control the driven upward and downward movement of the driven support member 24, including motor- or hand-driven mechanisms connected with the driven support member 24 by way of cables or chains. In this respect, such arrangements may provide increased range of motion of the driven support member 24 between the raised and lowered positions.

Figure 2:
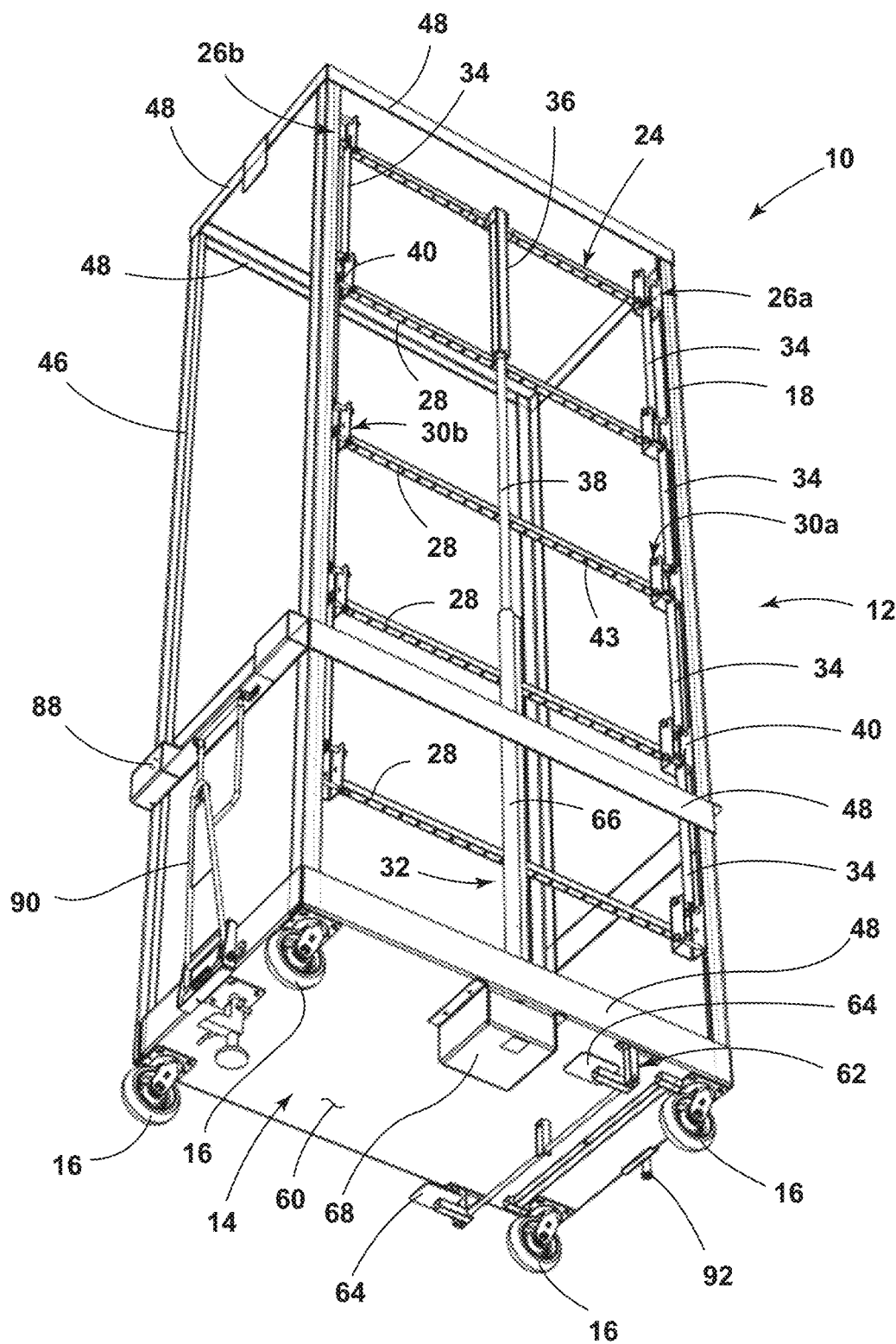
FIG. 2 is a back-bottom perspective view of the transportation rack.

As shown in FIG. 2 the actuator 32 can be mounted to base 14 in a laterally-central position toward the rear of the base 14 (i.e., opposite the open front 56) and can be positioned such that the housing 66 extends through a hole in the base 14. In this manner, motor 68 and a corresponding cover 69 may be positioned beneath surface 60 to avoid interference with items carried by rack 10, as discussed further below. Opposite from the mounting with frame 12, actuator 32 couples with the driven support member 24 by way of extension arm 36 that couples on one end thereof with the free end of piston 38 and on the other end thereof with the horizontal extension 43 of the driven support member 24.

Figure 10:
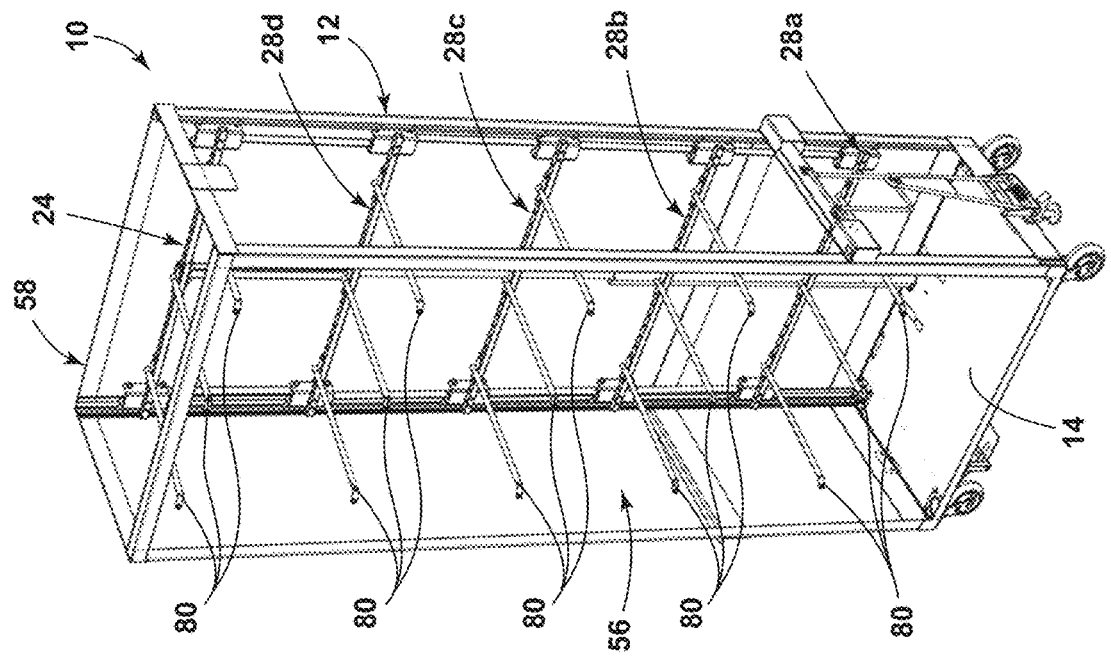
FIG. 10 is a front perspective view of the transportation rack with a plurality of arms coupled with the support members.
Figure 9:
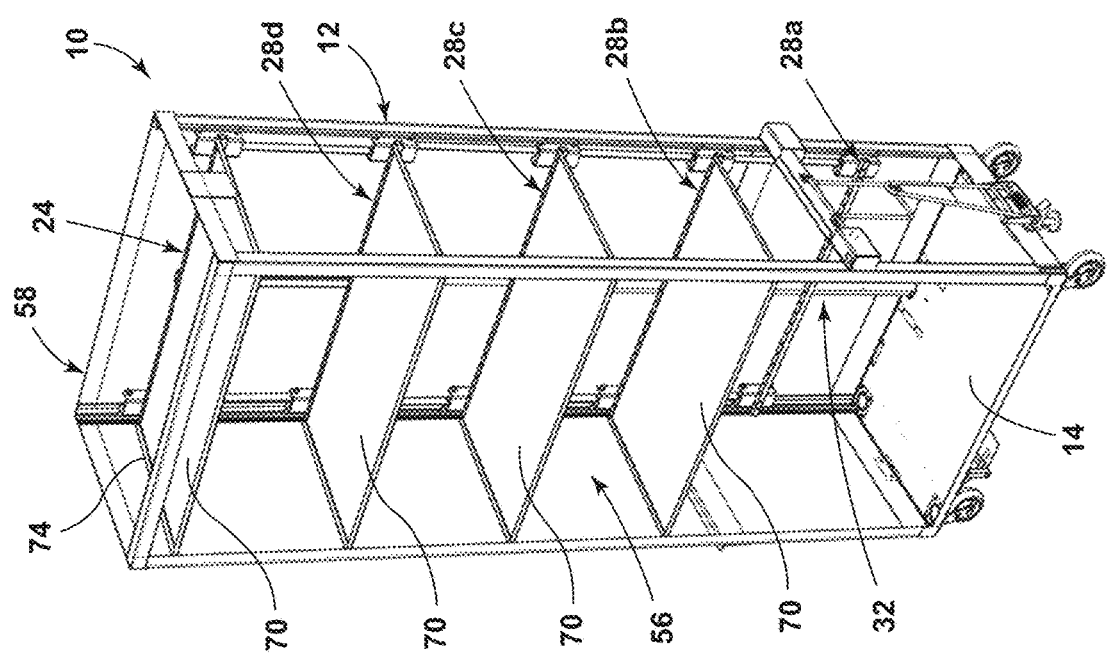
FIG. 9 is a front perspective view of the transportation rack with a plurality of shelves coupled with the support members.

Turning to FIGS. 9 and 10, the transportation rack 10 can be configured with various storage components, illustrated as shelves 70 in FIG. 9 and arms 80 in FIG. 10, to retain items on the rack 10. In this manner, the storage components 70 and 80 can be used to retain and transport various parts or components via rack 10. In one such aspect, the transportation rack, configured with one or more of the storage components 70 and 80 (including various combinations thereof) can be used as "dunnage" racks to transport or move parts within a factory or assembly line setting. In this respect, the movement of the support members 24 and 28, as facilitated by the movement of the driven support member 24 and the above-described collapsing movement of at least some of the suspended support members 28 allows for transportation and use of additional items beyond what could be realized by way of a rack with fixed storage components. More particularly, the present rack 10 allows items to be placed on ones of the storage components 70 or 80 assembled with the driven support member 24 and upper ones of the suspended support members 28 for access by a user (such as a factory or assembly-line worker, for example) by lowering of the driven support member 24, which lowers the suspended support members 28 by the same distance until such point that the lower ones of the suspended support members 28 collapse against the base 14 or the suspended support members 28 beneath them, as discussed above. In this arrangement, the rack 10 can be fully loaded with items on all of the storage components 70 and 80 for transportation to the desired area, with some of the items being positioned on storage components that may be positioned at a height of greater than six feet, and some at least 10 feet, off of the surface S on which the rack 10 is positioned such that they are generally inaccessible to most users while standing on the surface S. Given that many factory settings do not accommodate ladders, steps, or the like, and that the use of such items increases time and effort in reaching items on the storage components 70 and 80, the present rack allows the associated support members 24 and 28 to be lowered such that the items can be easily reached by a user standing on the surface S.

Figure 11:
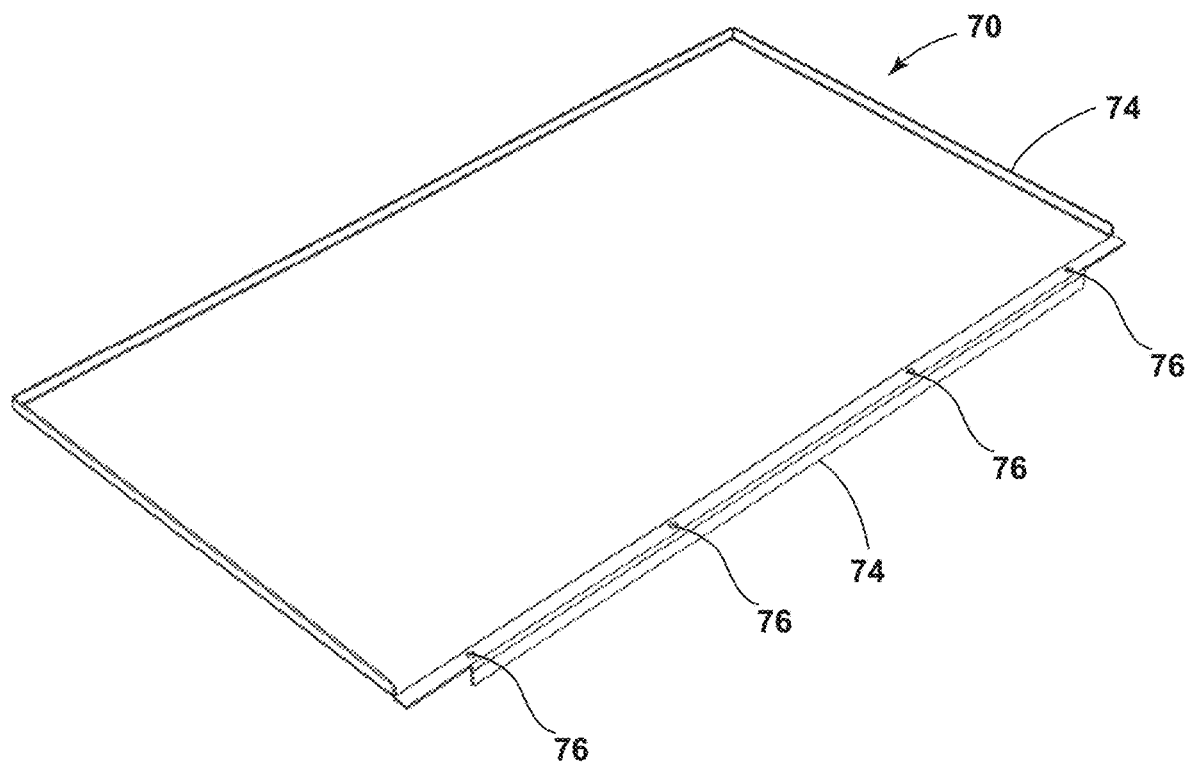
FIG. 11 is a back perspective view of a shelf of the plurality of shelves illustrated in FIG. 9.

Referring to FIGS. 9 and 11, the above-mentioned shelves 70 can be configured to be coupled with the support members 24 and 28, including by the use of mechanical fasteners, such as bolts secured using nuts, that are assembled through the holes 72 in the horizontal extensions 43 of the support members 24 and 28. The shelves 70 can be of a metal material, such as aluminum, steel, or the like, with sufficient rigidity to extend from the support members. In one aspect, the shelves 70 can be formed with flanges 74 extending along the perimeter thereof to provide increased rigidity and structural support thereof (and to help locate shelves 70 on the horizontal extensions 43. The shelves 70 can also include holes 76 that align with selected ones of the holes 72 in the horizontal extensions 43 for the receipt of fasteners to couple the shelves 70 with the horizontal extensions 43. In a further aspect, the shelves 70 can be configured to extend upwardly in the direction away from the horizontal extensions 43 toward the open front side 56, such as by an angle of about 4°, to allow downward flexing of the shelves 70 under the weight of the items stored thereon, while remaining acceptably level (e.g., such that items do not slide off of the shelves 70). In various examples, the shelves can be fabricated from steel, aluminum, or other suitable metals and alloys. In further examples, one or more of the shelves can be of plastic, fiberglass reinforced polymer, carbon fiber reinforced polymer, or the like, which may provide advantageous weight savings to reduce the load on actuator 32, particularly during raising of the support members 24, 28.

Figure 12:
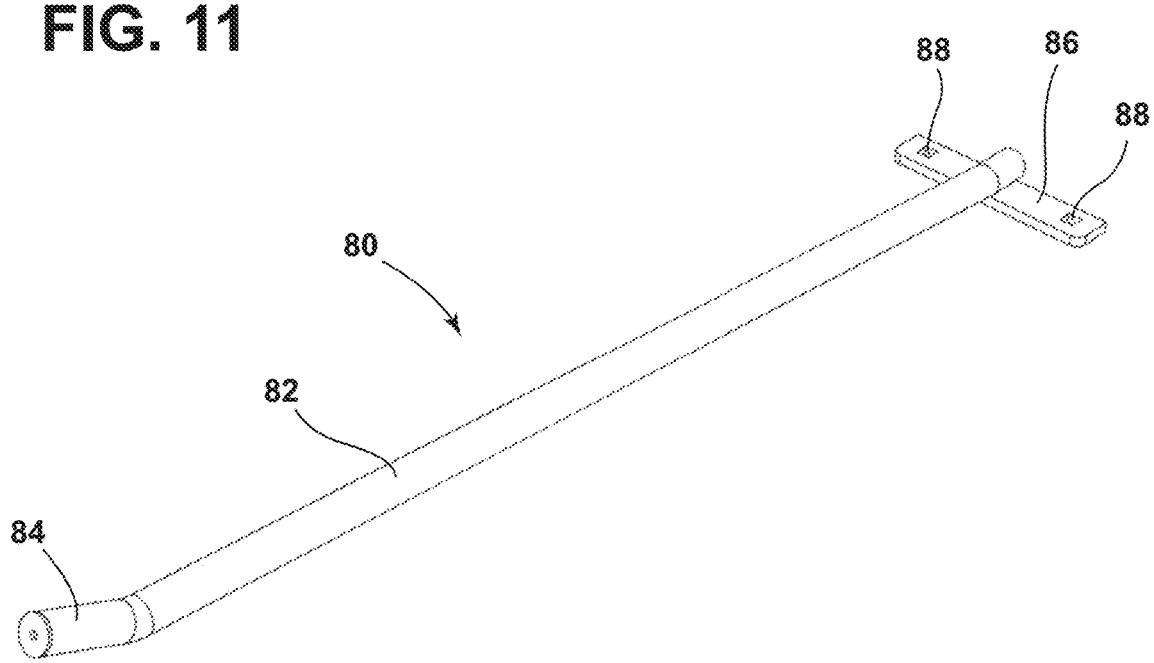
FIG. 12 is a front perspective view of an arm of the plurality of arms illustrated in FIG. 10.

Referring to FIGS. 10 and 12, the above-mentioned arms 80 can include a rod 82 that may be of a metal material, such as aluminum, steel, or the like, as well as various plastics or fiber-reinforced polymers, all of which may be hollow in construction to improve the rigidity thereof, while reducing weight. In one aspect, the rod 82 may include an upturned end 84 to help retain items thereon. The arms 80 include a mount 86 that extends outwardly on both lateral sides of the rod 82 and is rigidly joined (e.g., by welding) thereto. The mount 86 includes holes 88 that are spaced to align with respective ones of the holes 72 in the horizontal extensions 43 for attachment of the arms 80 therewith, including by mechanical fasteners, as discussed above with respect to the shelves 70, such that the rods 82 extend generally horizontally outward from the support members 24 and 28. The rods 82 can be coupled with the mounts 86 so as to extend upward (e.g., by about 4°) to help further retain items on the arms 80 and/or to help maintain the arms from bending to a downwardly-angled position, either by bending directly or under the torsional loading of the support members 24 and 28 with which they are connected. In this manner, arms 80 can be used to hang items configured for or otherwise suitable for hanging within the structure of rack 10. In various aspects, more or fewer than the three arms 80 connected with support members 24 and 28 shown in FIG. 10, depending on the size and configuration of the items to be hung on the arms 80. In the present example, the horizontal members 43 can each include twenty-three holes 72 spaced at 2" intervals, with the holes 88 on the mounts 86 being positioned four inches from each other such that up to seven arms 80 could be coupled with each support member 24 or 28. In other examples, different numbers of arms 80 can be affixed with each of the support members 24 and 28, as desired based on the items to be transported. In further examples, various combinations of arms 80 and shelves 70 can also be assembled with rack 10.

Figure 14:
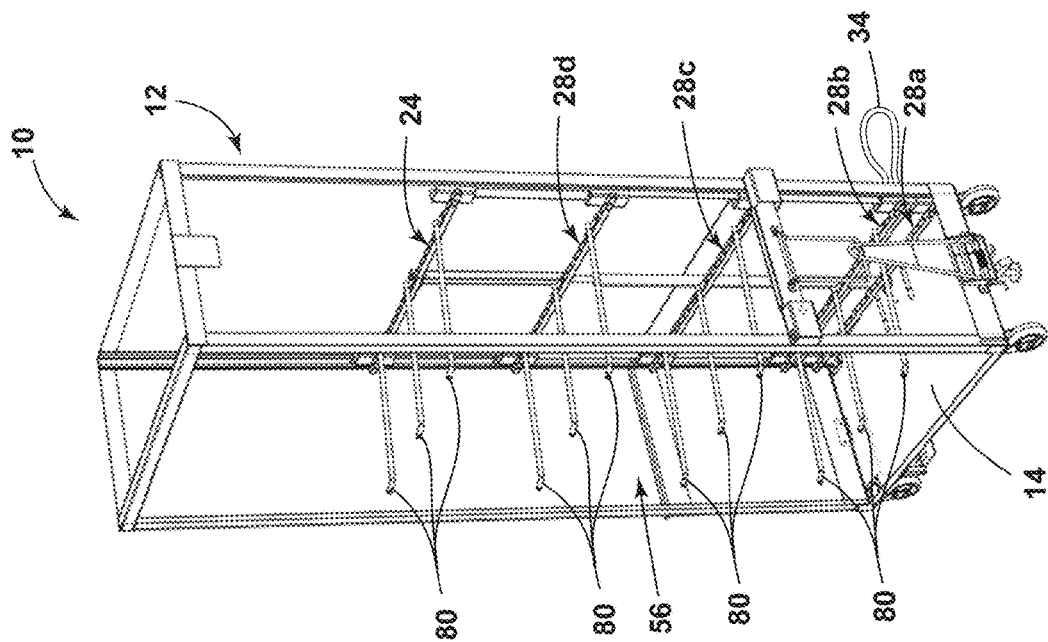
FIG. 14 is a front perspective view of the transportation rack of FIG. 10 with the plurality of arms coupled with the support members in a lowered position.
Figure 13:
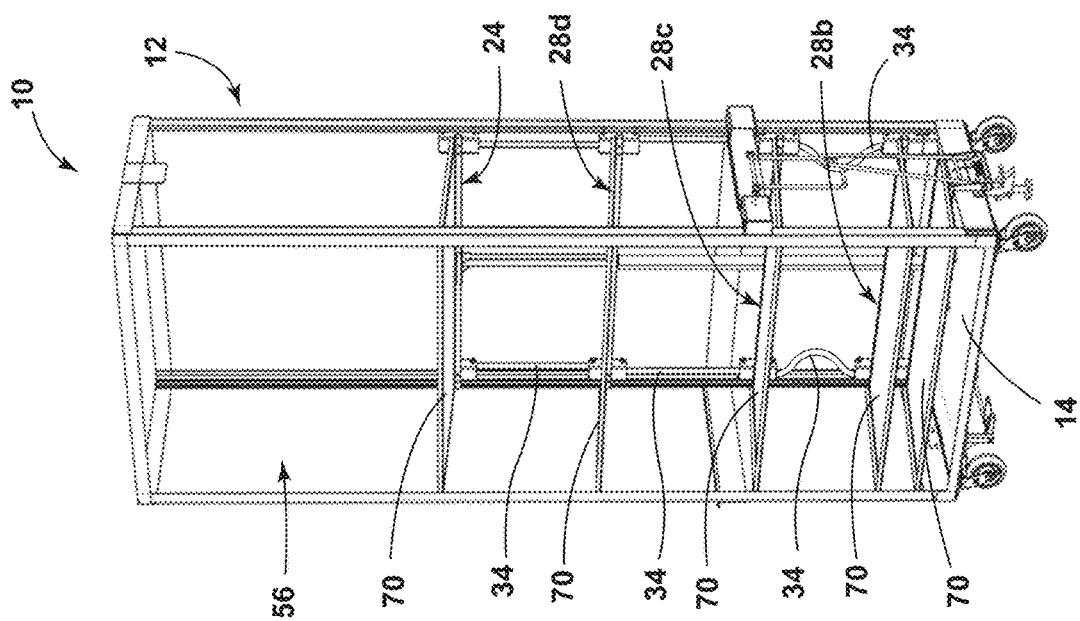
FIG. 13 is a front perspective view of the transportation rack of FIG. 9 with the plurality of shelves coupled with the support members in a lowered position.

As shown in FIGS. 13 and 14, the coupling of the shelves 70 and arms 80 with the support members 24 and 28 allows for lowering of the upper shelves 70 and arms 80 by way of the above-described lowering of the driven support member 24. As further shown, the lowering of the driven support member 24 results in collapsing of the shelves 70 and arms 80 against or adjacent the base 14. In this manner, the rack 10 may be unloaded starting from the lowermost shelf 70 or arms 80 coupled with the lowermost suspended support member 28b, at which point the driven support member 24 can be lowered to bring the lowermost suspended support member 28b into contact with the base 14, such that, for example, the shelf 70 or arms 80 on the uppermost suspended support member 28a can be reached. This unloading can continue until the items on the shelf 70 or arms 80 on the driven support member 24 can be accessed and/or the driven support member 24 is in the lowered position. In a similar manner, the rack 10 in either configuration can be loaded in the opposite manner (i.e., starting with the driven support member 24 in the lowered position). Notably, items on the storage component 70 or 80 associated with the driven support member 24 may extend upwardly out of the open upper side 58 of the frame 12. Variations of the depicted storage components 70 and 80 can be used with the depicted rack 10, including U-shaped rods with laterally-extending storage rods, elongate storage bins, or the like.

As further shown in the Figures, rack 10 can include an electrical coupling 88 mounted externally on the frame 12 (such as by being fixedly coupled on one of the first members 46, 48. Electrical coupling 88 is, in turn, electrically connected with the electric motor 88 of the actuator 32. In this manner, an external control unit 104 can be connected to actuator 32 by way of coupling 100 for providing directional control of motor 68 to operate actuator 32. Such an assembly allows a control unit, which may be somewhat bulky, to be positioned in a location (e.g., a station on an assembly line) where one or more racks 10 may be used, including in groups, as discussed further below. In such an arrangement, the control unit may be connected with a particular one of such racks 10 for which movement of the driven support member 24 is desired. Because such movement may occur generally infrequently and may be coordinated with the need to move additional driven support members 24 of other racks 10, a cost and/or weight saving may be realized by associating control units with stations, rather than individual racks 10. In this manner, the control unit can be decoupled from electrical coupling 88 and reconnected with the coupling 88 of another rack 10, when needed. Such use can also allow the control unit to be coupled with other safety interlock devices, such as foot pedals, or the like, to require a user to be safely positioned away from rack 10 prior to movement of driven support member 24. Alternatively, coupling 88 may be replaced by a control unit directly mounted to rack 10 and directly coupled with motor 68. An example of such coupling is shown in U.S. Pat. No. 9,738,477, entitled "TELESCOPING DUNNAGE RACK" ("the '477 Patent"), the entire disclosure of which is incorporated by reference herein.

As further shown in the Figures, the frame 12 may further include a coupling extension 90 mounted on one side thereof and a hitch member 92 mounted on a side opposite the side to which coupling extension 90 is mounted. The coupling extension 90 and hitch member 92 can be configured for mutual engagement such that adjacent racks 10 can be coupled together by attachment of the coupling extension 90 of one rack 10 with the hitch member 92 of another rack 10. Hitch member 92 can be a generally straight post mounted in a downwardly-extending manner beneath one of the horizontal support members 48 defining the base 14. In such an arrangement, coupling extension 90 can include a looped portion 94 on a free end thereof through which the hitch member 92 can be received. Further, the coupling extension 90 can be spring-biased toward the retracted position shown the figures to provide automatic retraction thereof when decoupled from hitch member 92. Further, in such an arrangement, the biasing of coupling extension 92 can maintain loop 94 in an engaged position with hitch member 92 due to the downward orientation thereof, which is such that the biasing of coupling extension 90 is maintained against the horizontal support member 48 from which hitch member 92 extends. The use, and additional variations of, the hitch member 92 and coupling extension 90 are further shown and described in the above-referenced '477 Patent.

In this manner, a method for providing parts to a production line (including a portion thereof) can include transporting an assembly of coupled racks 10, as discussed above to an assembly location. Various ones of the parts can then be selectively removed from the lower storage components 70 or 80, through the open front side 56 of the frame 12. When the parts have been removed from the lower storage components 70 or 80, the control unit can be used to cause the actuator 32 in the first rack 10 to lower the driven support member 24. In this manner, the control unit can be coupled with the electrical coupling 88 of rack 10 before or after unloading of the lower area thereof. As discussed above, the lower ones of the suspended support members 28 collapse against the base 14 to accommodate the lowering of the remaining support members 24 and 28. Subsequently, parts are removed from the upper storage components 70 or 80 through the open front side 56 of the frame 12. Similarly, parts can be removed from successive racks 10 in a similar sequence with the control unit being decoupled from an empty rack 10 and coupled with the next rack 10. As discussed above, such as sequence can include up to 5 racks 10 or more coupled together and transported to the assembly line or portion thereof.

The invention disclosed herein is further summarized in the following paragraphs and is further characterized by combinations of any and all of the various aspects described therein.

According to another aspect of the present disclosure, a transportation rack includes a frame having a base configured for resting on a surface and first and second track members and positioned parallel to each other and extending upwardly away from the base between respective lower ends and upper ends, a first support member extending between the track members and respectively slidably connected with each of the first and second track members at opposite lateral ends of the first support member, and a second support member extending between the first and second track members and respectively slidably connected with each of the first and second track members at opposite lateral ends of the second support member, the second support member being flexibly connected with the first support member. An actuator is coupled between the frame and the first support member and is operable to move the first support member between a raised position and a lowered position along the track members such that the second support member is suspended from the first support member by the flexible connection therebetween at least when the first support member is in the raised position.

The second support member can rest on the base of the frame when the first support member is in the lowered position.

The flexible connection of the second support member with the first member can define a supporting distance between the first and second member, and the second support member can be suspended from the first support member at the suspension distance when the first support member is in the raised position and can be positioned within the suspension distance with respect to the first support member when the first support member is in the lowered position.

The second support member can be suspended from the first support member when the first support member is positioned from the base at a distance greater than the supporting distance.

The transportation rack can further include a third frame member extending between the first and second track members and respectively slidably connected with each of the first and second track members at opposite lateral ends of the second support member, the third support member can be flexibly connected with the first support member such that the third support member is positioned at a first supporting distance beneath the first support member when the first support member is in the raised position, and the second support member can be flexibly connected with the first support member by way of being flexibly connected with the third support member such that the third support member is at a second supporting distance from the second support member when the first support member is in the raised position.

The second support member can be in a resting position adjacent the base of the frame and the third support member can rest on the first support member when the first support member is in the lowered position, and the flexible connection of the second support member with the first member can define a supporting distance between the first and second member, the second support member being suspended from the first support member at the suspended distance when the first support member is in the raised position and being positioned within the suspended distance with respect to the first support member when the first support member is in the lowered position.

The first and second support members can each include first and second carriage units that slidably connect the first and second support members with the first and second track members to define the opposite lateral ends of the first and second spurt members, respectively, and a horizontal member extending between the first and second carriage members.

The first and second carriages can each include at least one wheel mounted therewith and engaged with a respective one of the first and second track members.

The second support member can be flexibly connected with the first support member between the first carriages of the first and second support members and the second carriages of the first and second support members by a pair of flexible connection members.

The second support member can be flexibly connected with the first support member by a pair of flexible connection members extending respectively between the first ends of the first and second support members.

The pair of flexible connection members comprise nylon straps.

The transportation rack can further include a plurality of arms coupled with and extending generally horizontally away from respective ones of the first and second support members.

The transportation rack can further include a shelf coupled with one of the first or second support members.

According to yet another aspect, a transportation rack includes a frame having a base configured for resting on a surface and first and second track members and positioned parallel to each other and extending upwardly away from the base between respective lower ends and upper ends, a driven support member extending between the track members and respectively slidably connected with each of the first and second track members at opposite lateral ends of the driven support member, and an actuator coupled between the frame and the driven support member and operable to move the driven support member between a raised position and a lowered position along the track members. A plurality of suspended support members including an uppermost suspended support member are flexibly connected with the driven support member with remaining ones of the suspended support members successively flexibly connected together such that the suspended support members are suspended from the driven support member by the flexible connection therebetween at least when the driven support member is in the raised position.

A lowermost one of the suspended support members can rest on the base of the frame when the driven support member is in the lowered position.

The flexible connection of the driven support member and the suspended support members can be such that a suspension distance is defined between the driven support member and the lowermost one of the suspended support members when the driven support member is in the raised position, and the lowermost one of the suspended support members can be positioned within the suspension distance with respect to the driven support member when the first support member is in the lowered position.

The lowermost one of the suspended support members can be in a resting position adjacent the base of the frame and at least one of the remaining ones of the suspended support members resting on the lowermost one of the suspended support members.

The driven support member and the suspended support members can each include first and second carriage units that slidably connect the first and second support members with the first and second track members to define the opposite lateral ends of the first and second spurt members, respectively, and a horizontal member extending between the first and second carriage members.

The driven support member and the suspended support members can define a suspended distance when the driven support member is in the raised position, and the suspended support members can at least partially collapse against the base of the frame such that the driven support members and the suspended support members extend through a height that is less than the suspended distance when the driven support member is in the lowered position.

A transportation rack includes a frame having a base configured for resting on a surface and first and second track members and positioned parallel to each other and extending upwardly away from the base between respective lower ends and upper ends, a driven support member extending between the track members and respectively slidably connected with each of the first and second track members at opposite lateral ends of the driven support member and moveable between a raised position and a lowered position along the track members, and a plurality of suspended support members including an uppermost suspended support member flexibly connected with the driven support member with remaining ones of the suspended support members successively flexibly connected together such that the suspended support members are suspended from the driven support member by the flexible connection therebetween at a suspended distance at least when the driven support member is in the raised position and the suspended support members at least partially collapse against the base of the frame such that the driven support members and the suspended support members extend through a height that is less than the suspended distance when the driven support member is in the lowered position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A transportation rack, comprising:
   a frame having a base configured for resting on a surface and first and second track members positioned parallel to each other and extending upwardly away from the base between respective lower ends and upper ends;
   a first support member extending between the track members and respectively slidably connected with each of the first and second track members at opposite lateral ends of the first support member;
   a second support member extending between the first and second track members and respectively slidably connected with each of the first and second track members at opposite lateral ends of the second support member, the second support member being coupled with the first support member by a flexible connection; and
   an actuator coupled between the base of the frame and the first support member and operable to move the first support member into a raised position along the track members by extension of the actuator and into a lowered position along the track members under control of the actuator, wherein the second support member is suspended from the first support member by the flexible connection therebetween at least when the first support member is in the raised position.

2. The transportation rack of claim 1, wherein the second support member rests on the base of the frame when the first support member is in the lowered position.

3. The transportation rack of claim 2, wherein the flexible connection of the second support member with the first support member defines a supporting distance between the first and second support members, the second support member being suspended from the first support member at a suspended distance when the first support member is in the raised position and being positioned within the suspended distance with respect to the first support member when the first support member is in the lowered position.

4. The transportation rack of claim 3, wherein the second support member is suspended from the first support member when the first support member is positioned from the base at a distance greater than the supporting distance.

5. The transportation rack of claim 1, further including a third support member extending between the first and second track members and respectively slidably connected with each of the first and second track members at opposite lateral ends of the third support member, wherein;
   the third support member is flexibly connected with the first support member such that the third support member is positioned at a first supporting distance beneath the first support member when the first support member is in the raised position; and
   the second support member is flexibly connected with the first support member by way of being flexibly connected with the third support member such that the third support member is at a second supporting distance from the second support member when the first support member is in the raised position.

6. The transportation rack of claim 5, wherein:
   the second support member is in a resting position adjacent the base of the frame and the third support member rests on the first support member when the first support member is in the lowered position; and
   the flexible connection of the second support member with the first support member defines a supporting distance between the first and second support members, the second support member being suspended from the first support member at the suspended distance when the first support member is in the raised position and being positioned within the suspended distance with respect to the first support member when the first support member is in the lowered position.

7. The transportation rack of claim 1, wherein the first and second support members each include first and second carriage units that slidably connect the first and second support members with the first and second track members to define the opposite lateral ends of first and second support members, respectively, and a horizontal member extending between first and second carriage units.

8. The transportation rack of claim 7, wherein the first and second carriage members each include at least one wheel mounted therewith and engaged with a respective one of the first and second track members.

9. The transportation rack of claim 7, wherein the second support member is flexibly connected with the first support member between the first carriage units of the first and second support members and the second carriage units of the first and second support members by a pair of flexible connection members.

10. The transportation rack of claim 1, wherein the second support member is flexibly connected with the first support member by a pair of flexible connection members extending respectively between first ends of the first and second support members.

11. The transportation rack of claim 10, wherein the pair of flexible connection members comprises nylon straps.

12. The transportation rack of claim 11, further including a plurality of arms coupled with and extending generally horizontally away from respective ones of the first and second support members.

13. The transportation rack of claim 11, further including a shelf coupled with one of the first or second support members.

14. The transportation rack of claim 1, wherein the actuator is a linear actuator having a piston connected with the driven support member and extendable from a housing connected with the base of the frame.

15. A transportation rack, comprising:
a frame having a base configured for resting on a surface and first and second track members positioned parallel to each other and extending upwardly away from the base between respective lower ends and upper ends;
a driven support member extending between the track members and respectively slidably connected with each of the first and second track members at opposite lateral ends of the driven support member;
an actuator coupled between the frame and the driven support member and operable to move the driven support member between a raised position and a lowered position along the track members; and
a plurality of suspended support members including an uppermost suspended support member flexibly connected with the driven support member with remaining ones of the suspended support members successively coupled together by a corresponding plurality of flexible connections such that the plurality of the suspended support members are suspended from the driven support member by the flexible connection therebetween at least when the driven support member is in the raised position;
wherein the driven support member and the suspended support members each include first and second carriage units that slidably connect the driven support member and the suspended support members with the first and second track members to define the opposite lateral ends of first and second support members, respectively, and a horizontal member extending between the first and second carriage units, each of the carriage units includes first and second wheels, each engaged with the respective one of the first and second track members.

16. The transportation rack of claim 15, wherein a lowermost one of the plurality of the suspended support members rests on the base of the frame when the driven support member is in the lowered position.

17. The transportation rack of claim 16, wherein:
the flexible connection of the driven support member and the suspended support members is such that a suspension distance is defined between the driven support member and the lowermost one of the suspended support members when the driven support member is in the raised position; and
the lowermost one of the suspended support members is positioned within the suspension distance with respect to the driven support member when the driven support member is in the lowered position.

18. The transportation rack of claim 17, wherein the lowermost one of the suspended support members is in a resting position adjacent the base of the frame and at least one of the remaining ones of the suspended support members resting on the lowermost one of the suspended support members.

19. The transportation rack of claim 15, wherein:
the driven support member and the plurality of the suspended support members define a suspended distance when the driven support member is in the raised position; and
the plurality of the suspended support members at least partially collapse against the base of the frame such that the driven support member and the suspended support members extend through a height that is less than the suspended distance when the driven support member is in the lowered position.

20. A transportation rack, comprising:
a frame having a base configured for resting on a surface and first and second track members positioned parallel to each other and extending upwardly away from the base between respective lower ends and upper ends;
a driven support member extending between the track members and respectively slidably connected with each of the first and second track members at opposite lateral ends of the driven support member and moveable between a raised position and a lowered position along the track members; and
a plurality of suspended support members including an uppermost suspended support member flexibly connected with the driven support member with remaining ones of the suspended support members successively coupled together by respective flexible connections such that the suspended support members are suspended from the driven support member by a flexible connection therebetween at a suspended distance at least when the driven support member is in the raised position and the suspended support members at least partially collapse against the base of the frame such that the driven support member and the suspended support members extend through a height that is less than the suspended distance when the driven support member is in the lowered position.

* * * * *